Dec. 14, 1954
A. P. GLENNY
2,697,218
RESETTABLE PICK-OFF FOR CONTROL
SYSTEMS FOR NAVIGATIONAL CRAFT
Filed June 14, 1951
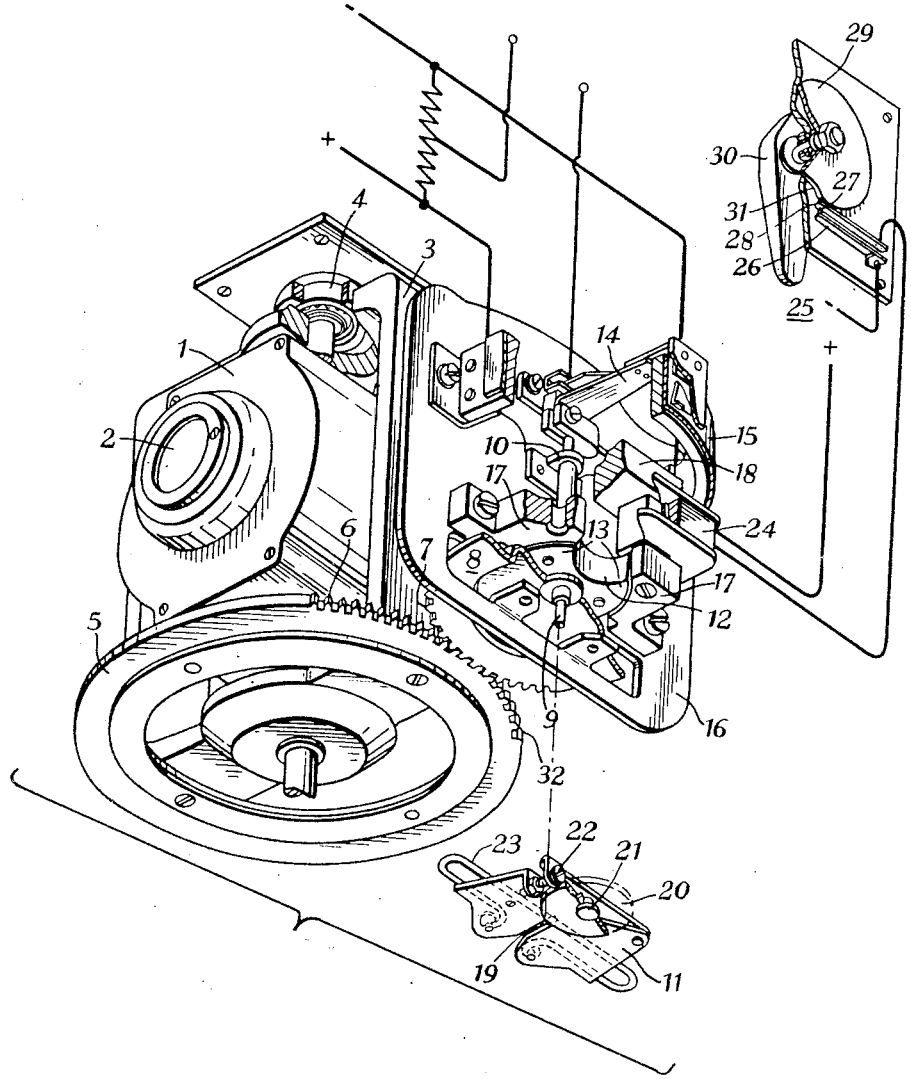
INVENTOR
ARTHUR PHILIP GLENNY
BY
Herbert H. Thompson
his ATTORNEY.

United States Patent Office 2,697,218
Patented Dec. 14, 1954

2,697,218

RESETTABLE PICK-OFF FOR CONTROL SYSTEMS FOR NAVIGATIONAL CRAFT

Arthur Philip Glenny, Hanworth, England, assignor, by mesne assignments, to The Sperry Gyroscope Company, Limited, Brentford, England, a company of Great Britain Application June 14, 1951, Serial No. 231,521

Claims priority, application Great Britain June 16, 1950

7 Claims. (Cl. 340—345)

The present invention relates to automatic control systems for navigated craft such as ships and aircraft, and particularly to systems of the kind in which the heading or other attitude of the craft in a given plane is automatically controlled from a stable reference instrument by means of a pick-off device associated therewith having a primary element and a secondary element, the instrument having a movable part which drives the primary element relatively to the secondary element as the craft changes its heading in the plane, the device being adapted to generate an error signal the magnitude of which is determined by the position of the primary element relative to the secondary element, and which is zero when the primary element is in a centralized position relative thereto.

"A stable reference instrument" means an instrument defining a datum line, the direction of which is fixed relatively to the earth in spite of angular movement of the craft about its axes. A gyroscope is an example of a stable reference instrument.

When the automatic control system is operating, the direction in which the primary element must be headed to cause the primary element of the pick-off device to become aligned with the secondary element is called in this specification the reference direction for the automatic control system.

The error signal may be used as input to means controlling the operation of a servo-motor for controlling the craft to eliminate the difference between the heading of the craft and the reference direction. When the craft is headed in the reference direction the error signal will be zero, i. e. the pick-off will be centralized and the input to the servo-motor control means will be also zero, which conditions will obtain until there is a difference between the heading of the craft and the reference direction.

In control systems of the kind set forth above, in order that any selected direction in the plane may be set to become the reference direction, there has been provided disengageable connection for removing the primary element of the pick-off device from the driving influence of the movable part of the instrument, means for centralizing the primary element relatively to the secondary element and means for restoring the primary element of the pick-off device through said driving influence whereby any selected direction in the given plane may be set to become the reference direction by restoring the primary element to the driving influence at an instant when the said axis is directed in the selected direction.

A control system of the kind set forth above and provided with all of such means is termed "a control system of the kind specified."

In order to select a direction in the plane to be the reference direction it is known, in particular, to provide an electromagnet adapated to be excited to remove the primary element of the pick-off device from the driving influence of the movable part of the instrument, and a spring interconnecting the primary and secondary elements and operating to bias the primary element continuously toward the centralized position with respect to the secondary element so as to centralize the primary element relatively to the secondary element whenever the pick-off device is so removed whereby the error signal becomes zero. A disadvantage of this arrangement is that disturbing loads are exerted on the stable reference instrument during operation tending to centralize the movable part of the instrument relatively to the secondary element of the pick-off device and thus constrain it to follow angular movements of the craft.

According to the present invention, in a control system of the kind specified, there is provided means for centralizing the primary element relatively to the secondary element and which is adapted to exert no centralizing force while the primary element is under the driving influence of the instrument.

If it is desired to select a particular direction in the plane as the reference direction the disengageable connection for removing the pick-off device from the driving influence of the movable part of the instrument may be set into operation by hand, whereupon the craft may be turned manually, or in systems in which provision is made for turning the craft under automatic control the act of bringing turn-setting apparatus into operation may also operate the disengageable connection.

With resetting of the system, the primary element will be maintained by the centralizing means in the centralized position relative to the secondary element, and when the turn is completed, i. e. when the craft is headed in the selected direction means for restoring the pick-off device to the driving influence of the movable part of the instrument may be set into action.

Since the primary element will be in the centralized position at the instant of restoration when the selected direction is being followed by the craft the control system will act to maintain the craft headed in that direction.

In a preferred embodiment of the invention the means for removing the pick-off device from the driving influence of the movable part of the instrument consists of an electromagnetic device having pole faces in spaced relation along the direction of motion of the primary element relative to the secondary element which co-operate with corresponding pole faces on an armature fixed to the primary element, the primary element of the pick-off device being arranged to be removed physically from the driving influence of the moving part of the instrument when the magnet is excited.

The centralized position is arranged to be that in which the magnet pole faces are in alignment with the armature pole faces, and, where the primary element is not in the centralized position at the moment of removal, forces between each magnet pole face and the corresponding armature pole face act to urge the primary element to the centralized position, at which position the error signal will be zero. It is a bodily pull of the magnet that disengages the primary element from the movable part of the instrument and a tangential force between corresponding pole faces that centralizes the primary element relatively to the secondary element. This structure provides a normally ineffective device that when effective centralizes the pick-off elements and disengages the disengageable connection.

No input will be supplied to the servo system by the pick-off device while the primary element is maintained removed from the driving influence of the instrument. Since the centralizing force is due to the electromagnet, which is only excited when it is desired to remove the pick-off device from the driving influence of the movable part of the instrument, centralizing force will only be exerted on such occasions. While the automatic control in azimuth is maintained there will be no load on the movable part of the instrument due to the centralizing means.

In order that the invention may be clearly understood and readily carried into practice, a specific embodiment thereof will now be described, by way of example only, with reference to the accompanying drawing, the single figure of which is a diagrammatic perspective view (partially exploded) of my improved control apparatus adapted to be mounted in an aircraft and to generate an error signal whenever the craft is headed i. e., has its fore-and-aft axes directed, in a direction the component of which in azimuth is other than the reference direction.

Referring now to the drawing, a stable reference instrument shown as an azimuth gyroscope comprises a rotor bearing case 1 and a rotor, not shown, mounted therein to spin about a horizontal axis 2, the rotor bearing case 1 being pivotally mounted about a horizontal axis in a gimbal ring 3 which, in turn, is pivotally mounted in bearings 4 (one of which is not shown). The bearings 4 are fixed to the outer casing of the instrument, so that their axis is parallel to the vertical axis of the craft.

The gyroscope is controlled in well-known manner so that the spin axis of the rotor remains normal to the axis of the bearings 4 in a substantially constant direction in azimuth relative to the earth, so that when the aircraft yaws or turns in azimuth, the gimbal ring 3 will rotate in the bearings 4 relatively to the outer casing of the instrument.

Fixed to the gimbal ring 3 is a ring or gear 5 whose axis coincides with the axis of bearings 4 and which has gear teeth 6 around a part of its circumference adapted to mesh with gear teeth 7 on a part of the circumference of a plate 8 mounted on a shaft 9, which is supported in bearings 10 and 11 for movement about its axis which is parallel with that of the bearings 4. The gimbal ring 3 and ring 5 act as the movable part of the instrument which by virtue of the teeth 6 and 7 is adapted to drive the plate 8 about the axis of the shaft 9 when the aircraft turns in azimuth.

An armature 12 in the form of a thick disc with portions cut out from it to form arcuate poles 13 is mounted on the plate 8 and a wiper arm 14 of a potentiometer 15 is mounted on the shaft 9 whereby the wiper arm 14, armature 12 and plate 8 rotate together about the axis of the shaft 9 as the ring 5 is rotated relatively to the casing of the instrument. The winding of the potentiometer 15 forms the secondary element of the pick-off device, the primary element of which comprises plate 8, shaft 9, armature 12, and wiper arm 14.

The bearing 10 is mounted on a support plate 16, to which is secured an electromagnet including two pole pieces 17 in the plane of the armature 12 situated radially outward from the arcuate pole pieces 13 and a built-up yoke 18 of U shape.

The bearing 10 is a universal pivot bearing, that is to say, the shaft 9 is mounted therein so as to be able not only to turn about the axis of the shaft 9 but also to pivot through a small angle about axes through the bearing which are perpendicular to the shaft 9.

The lower bearing is in the form of a slot 19 in plate 11 which allows the shaft to move about the pivot bearing 10 in the plane including the axis of the shaft 9 and the point of contact of the teeth 6 and 7, the stop 20 allowing sufficient movement of the shaft 9 for the teeth 7 to come out of mesh with the teeth 6.

This stop 20 is a disc rotatably mounted on a pin 21 whereby rotation of the shaft 9 while in contact with the stop 20 will cause the stop 20 to rotate. This arrangement ensures that friction opposing rotation of the shaft 9 when in contact with the stop 20 shall be slight. The position of the stop 20 may be adjusted by means of the screw 22.

The shaft 9 is biassed toward the ring 5 and teeth 6 by the spring 23, the central straight portion of which presses laterally against the shaft 9.

Windings 24 (one not shown) are mounted on portions of the yoke 18 whereby the pole piece 17 may be excited from the source of electrical supply 25 to which the windings 24 are connected. In series in one line from the electrical supply 25 to the windings 24 is a pair of normally open contacts 26 and 27. Contact 27 is provided with a cam follower 28 adapted to follow the contour of a cam 29, which may be rotated manually by means of a knob 30. The contour of the cam 29 includes a detent 31 such as to allow the contacts 26 and 27 to be open when the follower 28 drops therein. In other positions of the follower 28 relative to the cam 29 the contacts 26 and 27 are forced together. When the contacts 26 and 27 are closed the windings 24 are connected to the supply 25 and the armature 12 is attracted towards the pole piece 17 against pressure from the spring 23 which is not strong enough to overcome the attraction of the electromagnetic device.

It is arranged that the forces between the electromagnet and the armature 12 not only disengage the primary element of the pick-off device from control by the gimbal ring 3 through disengagement of the gears 6 and 7, but also urge the primary element into the centralized position with respect to the secondary element by virtue of magnetic torque about the axis of the shaft 9 due to forces between the pole pieces 17 and the corresponding pole pieces 13 on the armature 12. The former action is due to the component of the forces acting on the armature 12 radially outwards from the axis of the shaft 9 and the latter action is due to the circumferential component of the forces.

The ends of the potentiometer winding 15 are connected to a source of electrical supply (may be the source 25) and the error signal appears between the central tap of a resistance connected across this supply and the wiper arm 14. In the centralized position, wiper arm 14 is so placed relatively to the potentiometer winding 15 that no error signal is generated.

The stop 20 is adjusted so that there will be a small air gap between the corresponding pole faces when the shaft 9 is deflected against the stop 20.

In operation, to set a desired course in azimuth to become the reference direction that is to be maintained by the automatic control system, the pilot of the aircraft sets a turn by rotating the knob 30 which influences a circuit (not shown) to cause the craft to turn through an automatic control system which governs a control surface on the craft such as the rudder or ailerons thereby causing a turn to be set up until the craft reaches the course or heading set by the knob 30. The follower 28 is forced by the cam 29 out of detent 31 and the contacts 26 and 27 are closed causing the windings 24 to be excited to withdraw the primary element from the driving influence of the moving part of the instrument and to centralize the primary element.

Due to the bank set the craft will turn in azimuth. When the heading coincides with the desired course to be set, the pilot returns the knob 30 to its zero position, whereupon the follower 28 drops into the detent 31. This breaks the circuit of the windings 24 so that the shaft 9 is released and forced by the spring 23 towards the ring 5 whereby the teeth 7 come into mesh with the teeth 6 and the primary element of the pick-off device becomes again under the driving influence of the movable part of the instrument, but in such a relative position that the pick-off device provides zero error signal only when the craft is headed in the direction of the desired course, which thus becomes the reference direction for the automatic control system.

Both sets of teeth 5 and 6 have bevels on their edges parallel to the axis of the shaft 9 as shown at 31 whereby even if a tooth is not opposite a gap at the moment of mesh the ring 5 or the plate 8 will rotate a small amount until meshing of the gears is achieved.

As long as the heading of the craft remains in the reference direction, i. e. on the course in azimuth that has been set as above, the primary element will remain in the centralized position. However, if some deviation from the reference direction occurs, the axis of rotation of the rotor 1 will maintain its constant direction and the gimbal ring 3 together with the ring 5 rotate relatively thereto. Rotation of the ring 5 will drive the primary element through the medium of the teeth 6 and 7 and the armature 12 will take up a position unsymmetrical with respect to the pole pieces 17. At the same time the wiper arm 14 will move relatively to the potentiometer 25 to cause an error signal to be generated which will be a measure of the deviation in azimuth of the heading of the craft from the reference direction. The signal is used as input to the servo-motor control means for adjusting the control surfaces of the aircraft in a manner to restore the craft to move in the reference direction. No centralized torque will be acting upon armature 12 during this movement since the exciting windings 24 will be open-circuited at this time.

Turning of the craft back to the reference direction will cause the primary element to return to the centralized position, when the error signal will once more be zero. Thus, the apparatus will act to maintain the craft headed in the reference direction.

If it is desired to change the reference direction, that is to say, to change the course in azimuth, the pilot repeats the procedure described above for setting the course, so that when the craft has turned to the new course and has restored the pick-off device to the driving influence of the movable part of the instrument, the primary element will be in its centralized position so that the error signal will be zero in a position which now corresponds to the new course and the control system will operate as before except that wander from the new course is prevented rather than deviation from the original course.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It will also be clear from the foregoing that my invention is not limited to the control of the craft in azimuth by a directional gyroscope, but may be applied to the attitude control of the craft about any of its axes from an appropriate gyroscopic reference.

I claim:

1. In a system for controlling dirigible craft with a sensitive stable reference instrument, a pick-off with an element normally operatively connected to the instrument and an element fixed to the craft providing a controlling output with departure of the elements from a centralized relation relative to one another; means for resetting the system including a disengageable connection between the instrument and element of the pick-off normally operatively connected thereto, a normally ineffective device for disengaging said connection and for centralizing the elements of the pick-off only when disengaged whereby no torque is exerted on said instrument, and controllable means for rendering said normally ineffective device effective to simultaneously disengage said connection and centralize the elements of the pick-off, whereby upon release of said controllable means said device becomes effective to maintain the craft upon the course present at the time of said release.

2. A system of the character claimed in claim 1 in which said disengageable connection includes a pair of gears, one of which is operatively connected to the reference instrument, a shaft on which the other of said gears is mounted, a mounting for said shaft facilitating disengagement of the gears, and means for biasing said shaft to normally mesh the gears.

3. A system of the character claimed in claim 1 in which said centralizing and disengaging device is an electromagnet having an armature fixed to one of the parts of the disengageable connection, and said rendering means is an energizing circuit including the device and a resetting switch.

4. A system of the character claimed in claim 1 in which said disengageable connection includes a pair of motion transmitting parts, one of which is operatively connected to the reference instrument, a shaft on which the other of the parts is mounted, and a mounting for the shaft facilitating disengagement of the parts.

5. In a system for controlling dirigible craft with a position maintaining gyroscope, a pick-off with an element normally operatively connected to the gyroscope and an element fixed to the craft providing a controlling output with departure of the elements from a centralized relation relative to one another; means for resetting the system including a disengageable connection between the instrument and element of the pick-off normally operatively connected thereto, a normally ineffective electromagnetic device which when excited disengages said connection and centralizes the elements to the pick-off while so disconnected, and controllable means for energizing and deenergizing said electromagnetic device, whereby a new attitude of the craft may be effected while said device is energized and the craft maintained in said new attitude upon deenergizing said device.

6. A system of the character claimed in claim 5 in which said disengageable connection includes a pair of gears, one of which is operatively connected to the directional gyroscope, a shaft on which the other of said gears is mounted, a mounting for said shaft facilitating disengagement of the gears, and a spring biasing said shaft to normally mesh the gears.

7. A system of the character claimed in claim 5 in which said disengageable connection includes a pair of motion transmitting parts, one of which is operatively connected to the directional gyroscope, a shaft on which the other of the parts is mounted, a mounting for the shaft facilitating disengagement of the parts, said electromagnetic device includes an armature fixed to the shaft, and said energizing means is a circuit including said device and a resetting switch.

References Cited in the file of this patent

UNITED STATES PATENTS

| Number | Name | Date |
|---|---|---|
| 2,197,890 | Koster | Apr. 23, 1940 |
| 2,249,373 | Alkan | July 15, 1941 |
| 2,416,646 | Rylsky | Feb. 25, 1947 |
| 2,512,902 | Rossire | June 27, 1950 |
| 2,609,615 | Shivers | Sept. 9, 1952 |